Jan. 6, 1931.  F. A. GODFREY  1,788,054
CONDUIT ANCHOR FOR OUTLET BOXES
Filed Oct. 31, 1928  2 Sheets-Sheet 1
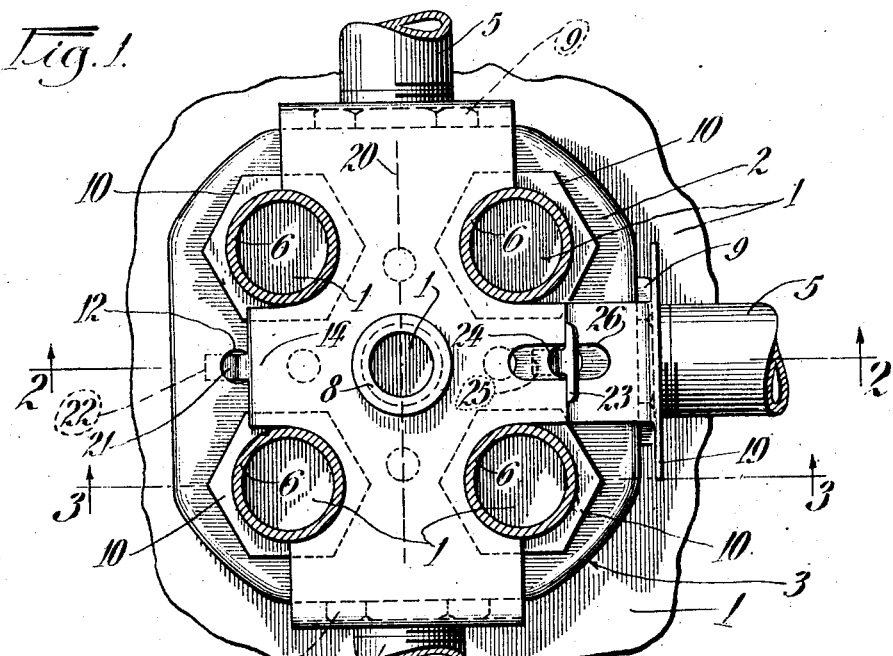
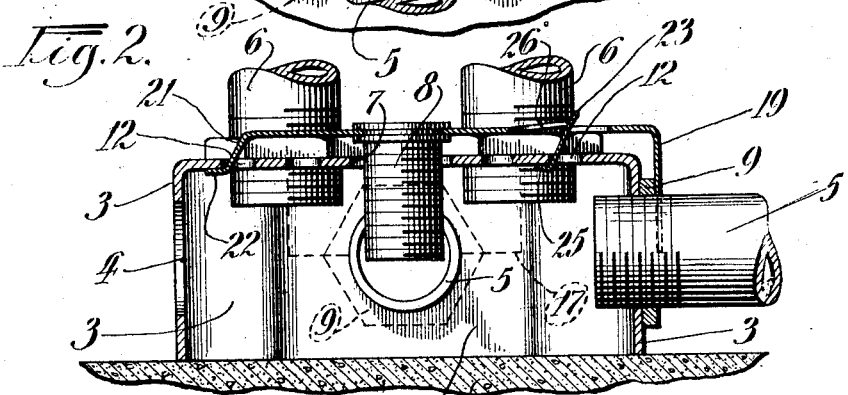
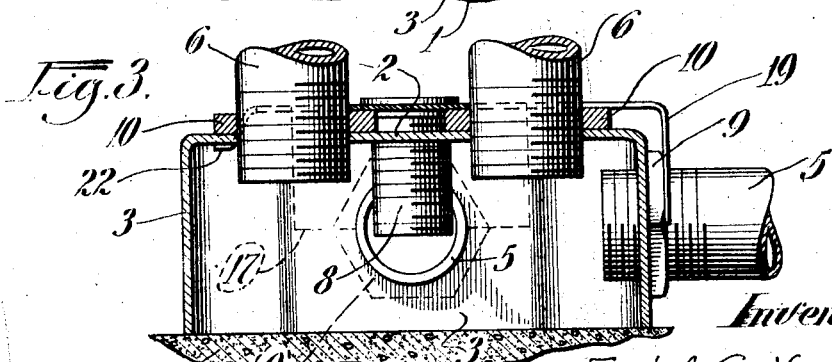
Inventor:
Fred A. Godfrey
By Albert Scheith
Attorney Jan. 6, 1931.  F. A. GODFREY  1,788,054
CONDUIT ANCHOR FOR OUTLET BOXES
Filed Oct. 31, 1928  2 Sheets-Sheet 2
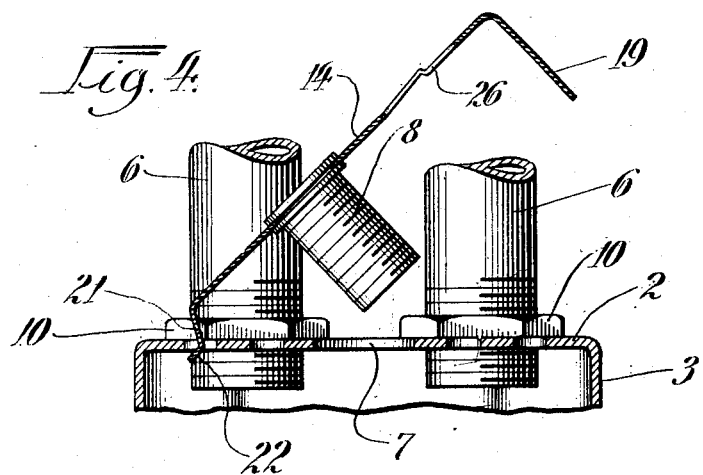
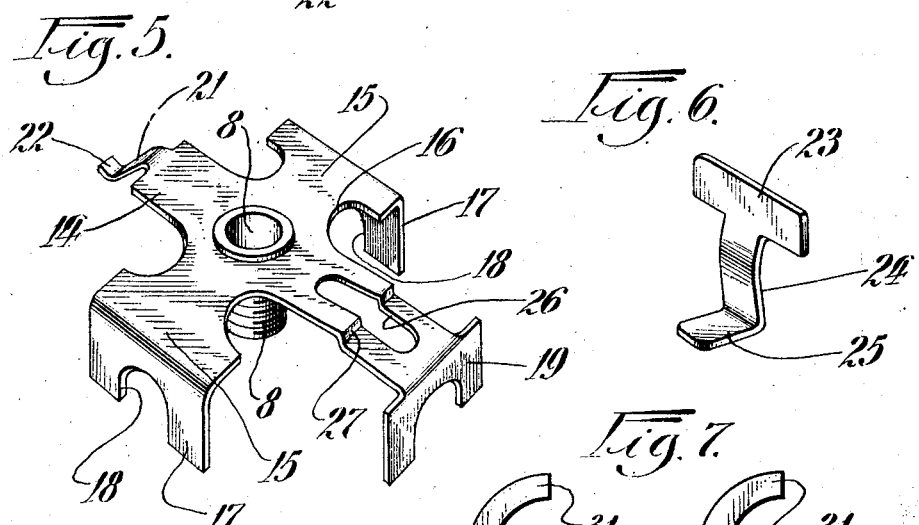
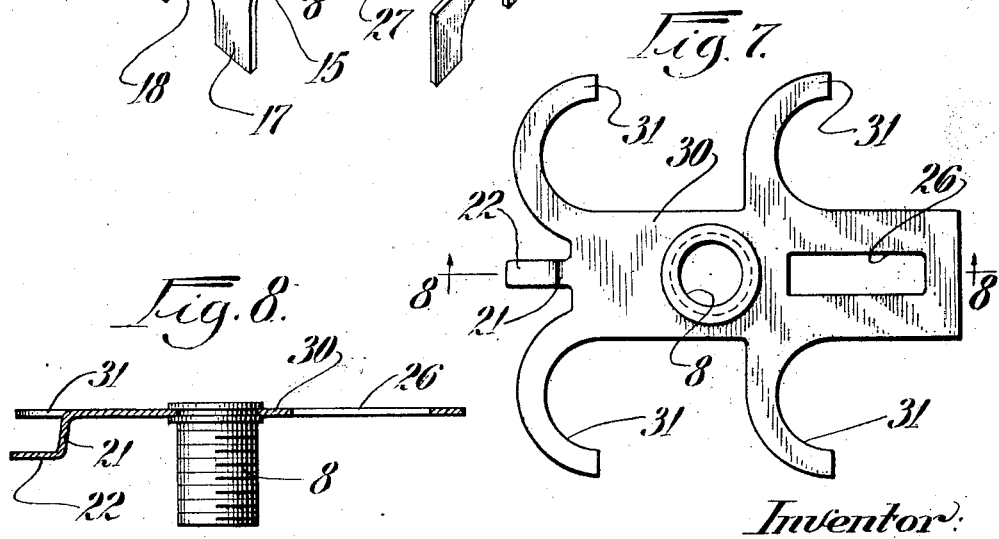
Inventor:
Fred A. Godfrey
By Albert Scheith
Attorney Patented Jan. 6, 1931

1,788,054

UNITED STATES PATENT OFFICE

FRED A. GODFREY, OF CHICAGO, ILLINOIS

CONDUIT ANCHOR FOR OUTLET BOXES

Application filed October 31, 1928. Serial No. 316,205.

My invention relates to outlet boxes for use with conduits for electric wires, and in its general objects aims to provide simple and inexpensive means for latching the conduits to an outlet box and for supporting a fixture stud in operative position with respect to the outlet box.

In buildings provided with concrete floors, it is customary to imbed the needed outlet boxes in the lower portions of these floors, and to imbed the associated conduits in the concrete along with these outlet boxes. For this purpose, each box needed for the ceiling outlets is temporarily fastened (mouth downward) to a form board on which the concrete is to be poured, so as to fix the intended location of this outlet box. The associated conduits are then disposed above the form board, with the ends of the conduits projecting through the usual top or side apertures in the box, or through both top and side apertures.

The extent to which each conduit enters the box is usually limited by a nut threaded on the conduit and disposed for engaging the exterior of the box, and the conduits are cut and bent with a view to having each such nut close to the exterior of the box. However, the conduits are apt to be bent out of shape by careless workmen, and the bends formed in the conduits which extend through the top of the box cannot be accurately predetermined as to their shapes, since the conduit will vary in the extent to which it springs back when released from a conduit bending device. Consequently, such conduits are apt to pull either partially or entirely out of the box.

To avoid this, an auxiliary locknut may be threaded on the end portion of each conduit for engaging the adjacent inner wall of the box, but this is a tedious and difficult task, since the heavy conduits must be raised off the form board to permit the electrician to reach into the mouth of the box, and since it is difficult for the electrician to locate the conduit ends when he cannot see them. This difficulty also holds true for the attaching of the usually needed central fixture stud to the top of the inverted outlet box.

Attempts have been made to overcome the major difficulty of anchoring the conduits to the outlet box by providing a flat metal strip extending between the downwardly entering conduits above the locknuts which are threaded on the latter, and nailing this strip separately to the form board. In practice, this has not proven satisfactory, for two reasons: One is the fact that in making such a strip sufficiently narrow to be placed freely between the conduits even when the latter are not carefully bent, the strip only slightly overhangs each locknut and is apt to let one or more of the locknuts slip past its edge if strains tend to lift the conduits. The other is due to the frequent loosening of the nails which fasten such strips to the form board. Moreover, such top strips have not solved the problem of anchoring conduits extending through the sides of the outlet box.

My present invention aims to overcome all of these difficulties by providing an anchoring member arranged so that it can be attached to the top of the inverted outlet box and so that the attaching can easily be effected from the exterior of the box without raising the latter and even without the use of tools. It also aims to provide an anchoring member for this purpose which will be so shaped as to overhang a relatively large portion of the outward face of each of the locknuts on the downwardly entering conduits, so that no shifting of this member will permit a locknut to slip past it. Moreover, my invention aims to provide an anchoring member which will also anchor laterally entering conduits to the outlet box, and one which anchoring member may have the needed fixture stud rigidly attached to it, so as to save additional labor in the installing.

Still further and also more detailed objects will appear from the following specification and from the accompanying drawings, in which Fig. 1 is a plan view of a ceiling outlet box seated on a form board, with four conduits entering its top and three conduits entering the outlet box horizontally, and with an anchoring member of my invention latching all of these conduits against retraction from the box.

Figs. 2 and 3 are vertical transverse sections, taken respectively along the lines 2—2 and 3—3 of Fig. 1.

Fig. 4 is a section similar to a portion of Fig. 2, showing the anchoring member as it appears when tilted during the attaching of it to the top of the outlet box.

Fig. 5 is a perspective view of the anchoring member included in Figs. 1 to 4.

Fig. 6 is an enlarged perspective view of the clip or latching member used for latching the anchoring member to the outlet box.

Fig. 7 is a plan view of another form of my anchoring member, namely one designed for anchoring only the downwardly entering conduits.

Fig. 8 is a section, taken along the line 8—8 of Fig. 7.

In Figs. 1 and 2, the horizontal form board 1 has seated on it an inverted outlet box of conventional type. This box includes lateral walls 3 having apertures, such as the apertures 4, through which conduits 5 can extend horizontally into the box. The top of the outlet box has the usual four spaced apertures through which conduits 6 can enter the box downwardly, and has a central aperture 7 through which a threaded fixture stud 8 can extend freely downward into the box. Locknuts 9 are threaded respectively on the laterally entering conduits 5, and locknuts 10 on the downwardly entering conduits 6, each such locknut being sufficiently far from the inner end of the corresponding conduit to limit the entry of the conduit into the box by the engagement of the locknut with an exterior wall portion of the box.

The top of the conduit box also has the usual smaller or auxiliary perforations 12 intended for allowing nails to be driven down through it, and I utilize two of these auxiliary perforations for permitting my anchoring member to be latched to the box without compelling the installer to reach into the box. This anchoring member—as shown separately in Fig. 5—has a cross-shaped top portion including a stem 14 of less width than the clear spacing between two of the downwardly entering conduits 6, and two arms 15 transverse of the stem 14, each such arm having a recess 16 adjacent to its juncture with the stem, which recess is shaped for extending close to one-half of the periphery of one of the conduits 6.

Each arm 15 has a side wing 17 depending from its free end, these side wings being spaced by a width sufficiently greater than the width of the outlet box, so that the wings will depend outside the locknuts 9 on the conduits 5 entering the adjacent sides of the box. Each of these side wings is preferably of such a height as to reach at least down to the level of the axis of the adjacent laterally entering conduit, this being made possible by providing each side wing with a downwardly open recess 18 of slightly larger diameter than the outside diameter of the conduit. Then I also desirably provide the rear end of the stem 14 of my anchoring member with a similarly formed and proportioned depending end wing 19, which end wing is spaced from the axis 20 of the transverse arms 15 by such a distance that this wing 19 will depend outside of the nut of the conduit 5 which enters that end of the outlet box.

Thus arranged, each of the three depending wings will be disposed for preventing a withdrawal of one of the three laterally entering conduits from the box when the anchoring member is in its operative position of Figs. 1 and 2. To secure the anchoring member in that position, I provide the forward end of its stem 14 with a depending arm 21 which has a forwardly bent finger 22 at its lower end, making these parts of such a size that the finger can readily be inserted through one of the auxiliary apertures 12 in the box top, and so that the inserted finger will underhang this box top when the stem 14 of the anchoring member seats on one or more of the locknuts above the top of the box.

Then I provide auxiliary fastening means for cooperating with the said latching finger in securing the anchoring member to the conduit box, for which purpose Fig. 6 shows a substantially T-shaped latching member comprising head 23, a shank 24 adapted to be slipped through a perforation 26 in the anchoring member, and a forwardly directed finger 25 at the lower end of the said shank. The perforation 26 is preferably a slot extending longitudinally of the stem 14 of the anchoring member and the shank 24 as well as the finger 25 are of such a width as to permit the finger to be inserted through another one of the top apertures 12, so as to hook the finger under the top of the conduit box. The portion of the stem 14 of the anchoring member extending across the perforation or slot 26 is desirably kinked as shown in Fig. 5, so as to present a rearwardly shoulder 27 disposed for latching the head 23 of the latching member against forward movement.

To provide also for mounting a fixture in proper relation to a ceiling conduit box, I desirably fasten a threaded fixture stud 28 at its upper end to the anchoring member in such a position that it will depend through the usual central aperture 7 in the top of the box. Thus constructed, my anchoring member can be slipped down between the previously inserted downwardly entering conduits 6 when in a tilted position, as shown in Fig. 4, so as to insert the forward finger through the forward auxiliary aperture 12, after which the anchoring member is swung down to dispose it in its horizontal position of Figs. 2 and 3. The latching member (of Fig. 6) is then slipped into position, thereby securing the anchoring member firmly to the box and simultaneously preventing a movement of all seven of the illustrated conduits away from the box.

Since both the anchoring member and the latching member are both cheaply made punchings, my attachment for conduit boxes can be manufactured at quite low cost; it can also be attached quickly and without the use of tools. In practice, sufficiently light metal can be used for my attaching member so that this can flex slightly during the attaching of the auxiliary fastening member, and the depending wings can be spaced somewhat outwardly of the lateral locknuts, although shown in the drawings as touching the latter.

However, while I have heretofore described my invention in a highly desirable embodiment, I do not wish to be limited to the particular shape or details of construction and arrangement thus described. Many changes might obviously be made without departing either from the spirit of my invention or from the appended claims. For example, the side wings and the end wing may be omitted when my anchoring member is to be used with conduit boxes in which the conduits all enter through the top of the box. For this purpose, Figs. 7 and 8 show an anchoring member of less shipping weight, in which the stem 30 has four arcuate arms 31 each shaped for overhanging one-half of one of the upper locknuts, and in which the recesses in these arms all face rearwardly. So also, the fixture stud can be omitted when not needed.

Furthermore, while I have illustrated and described my invention as used in connection with a downwardly open outlet box, it will be obvious that it can be employed equally well with conduit boxes in other positions; as for instance, for wall boxes in which the box will open laterally and the main portion of my anchoring member will be disposed in a vertical plane behind the box.

I claim as my invention:

1. For use with a downwardly open outlet box having top and lateral apertures, and with conduits extending respectively through such apertures into the box and each fitted with a nut adjacent to the exterior of the box: a conduit anchoring member having a main horizontal part overhanging portions of the nuts fitted upon the conduits extending through the top apertures in the box and having a side web depending along a side of the box adjacent to the outward face of a nut fitted to a conduit extending into that side of the box, and means connecting the top of the box with the said main part of the conduit anchoring member to prevent upward movement of the said member with respect to the box.

2. For use with a downwardly open outlet box having top and lateral apertures, and with conduits extending downward respectively through such apertures into the box and each fitted with a nut adjacent to the exterior of the box: a conduit anchoring member having a main horizontal part overhanging portions of the nuts fitted upon the conduits extending through the top apertures in the box and having a side web depending along a side of the box adjacent to the outward face of a nut fitted to a conduit extending into that side of the box, the conduit anchoring member having a portion hooked through another top aperture in the box with the tip of the said portion underhanging the top of the box, and separately formed means for connecting portions of the box top and the anchoring member which are both spaced horizontally from the said hooked portion, the said means and hooked portion cooperating to prevent upward movement of the anchoring member with respect to the box.

3. A conduit anchoring assembly as per claim 2, in which the separately formed means comprise a substantially T-shaped fastener having a head overhanging the anchoring member, and having a shank extending downwardly through the anchoring member into the box, the shank having at its lower end a finger bent to underhang the top of the box.

4. A conduit anchoring assembly as per claim 2, in which the separately formed means comprise a substantially T-shaped fastener having a head overhanging the anchoring member, and having a shank extending downwardly through the anchoring member into the box, the shank having a finger bent to underhang the top of the box; the fastener being so formed as to be insertible when the stem is tilted upwardly towards the said hooked portion and the anchoring member having a formation disposed for latching the head when the latter is thereafter moved away from the said formation.

5. For use with a downwardly open outlet box having spaced main apertures in its top, and with conduits extending downward respectively through these apertures and each fitted with a nut disposed above and adjacent to the top of the box: a conduit anchoring member comprising a horizontal main part having spaced parts respectively overhanging portions of the several nuts and having a downwardly bent finger in hooking engagement with the top of the box, and separately attached means connecting the said top with a part of the anchoring member spaced horizontally from the said finger and cooperating with the latter to prevent upward movement of the anchoring member with respect to the box.

6. For use with a downwardly open outlet box having in its top a central aperture and a plurality of conduit apertures radially outward of the central aperture, and with conduits each extending downwardly into the box through one of the conduit apertures and each fitted with a nut above and adjacent to the said top: a conduit anchoring member having portions each overhanging a part of one of the said nuts and having a threaded stud extending downwardly into the box through the central aperture, and two means at opposite sides of the said stud for connecting the conduit anchoring member with the box top to prevent upward movement of the said member with respect to the box.

7. A conduit anchoring assembly as per claim 6, in which one of the said means is integral with the anchoring member and in which the other thereof is separately formed for attachment after the connecting by the first named means have been effected.

8. A conduit anchoring assembly as per claim 6, in which both of the said means are arranged to afford hooking engagement with the box top.

9. A conduit anchoring assembly as per claim 1, in which each of the nut-overhanging portions of the anchoring member has a substantially semi-circular edge recess of a radius slightly larger than the external radius of one of the conduits, to permit each such portion to overhang substantially half of the body of one of the nuts.

10. For use with a downwardly open outlet box having two parallel rows of conduit apertures in its top and also having apertures in opposite sides of the box, and with conduits extending into the box through the respective apertures and each fitted with a nut adjacent to the exterior of the box: a conduit anchoring member comprising a main part having recessed portions each overhanging one of the nuts on the conduits extending through the apertures in the top of the box, and having two wings respectively depending at opposite sides of the box outward of the nuts on the conduits extending respectively through the said side apertures of the box, each of the wings having a downwardly open recess closely approaching the adjacent conduit; and two horizontally spaced fastening means directly connecting the box top with the main part of the anchoring member to retain the latter in its said disposition.

11. A conduit anchoring assemblage as per claim 10, in which each of the said recessed portions and recesses is formed so that the portion of the anchoring member adjacent thereto extends adjacent to one half of the outer face of one of the nuts.

Signed at Chicago, Illinois, October 27th, 1928.

FRED A. GODFREY.